April 28, 1959  R. M. P. O. RICHARD-FOY  2,884,532
DOSE-MEASURING DEVICE FOR IONISING RADIATION
Filed Nov. 8, 1955
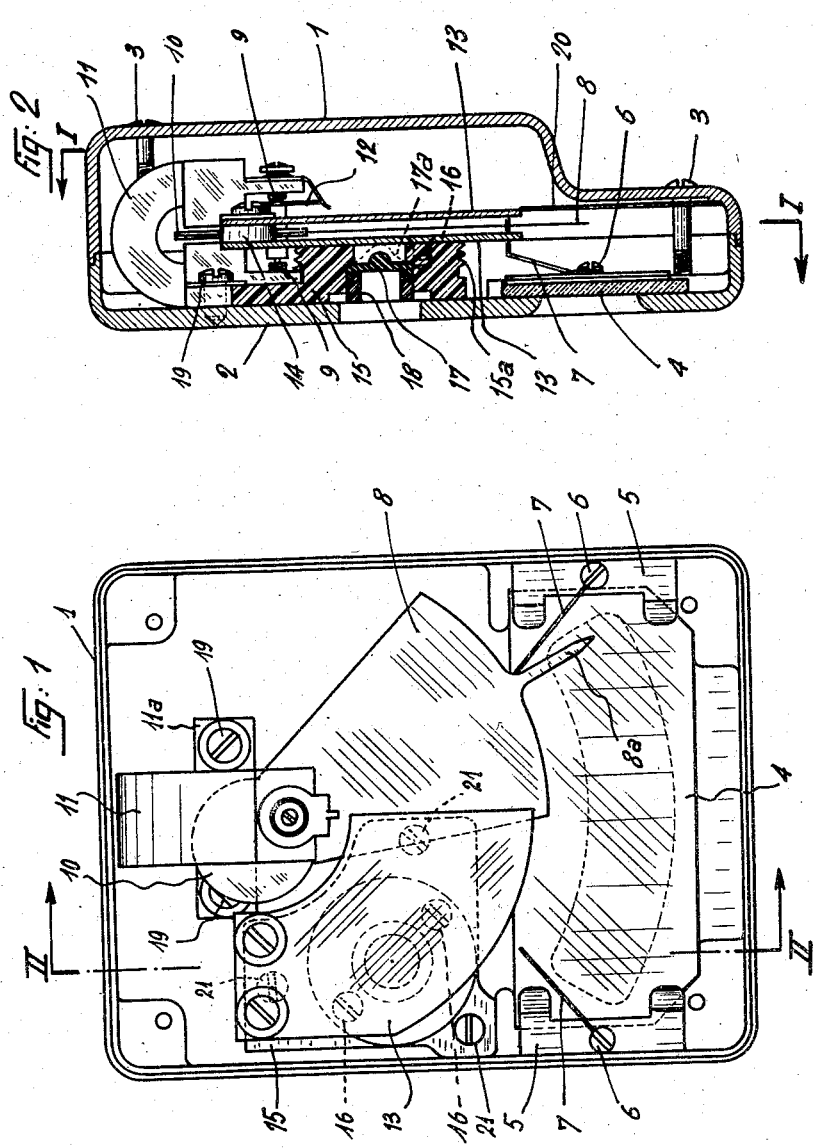
ROBERT M. P. O. RICHARD-FOY,
INVENTOR,
By: Mauro & Lewis,
ATTYS.

United States Patent Office 2,884,532
Patented Apr. 28, 1959

2,884,532

DOSE-MEASURING DEVICE FOR IONISING RADIATION

Robert M. P. O. Richard-Foy, La Celle-Saint-Cloud, France, assignor to Association des Ouvriers en Instruments de Precision (A.O.I.P.) (Société Anonyme Coopérative à Capital Variable), Paris, France, a French company Application November 8, 1955, Serial No. 545,673

Claims priority, application France December 16, 1954

5 Claims. (Cl. 250—83.3)

It is known that the "dose" of ionising radiation, generally expressed in Roentgen, is usually measured as it is received in a point in space for a pre-determined period of time, by means of two kinds of instruments.

One type integrates with respect to time, a current produced by a detector of ionisation, and its indication is given by a pointer on a scale.

The other type, which is a wire electrometer, is based on the electrostatic deflection of a stretched thread of quartz. The latter instruments are integrators in themselves and give a direct indication of the dose, but they necessitate the use of optical or amplifying devices in order to give a reading.

The present invention has for its object a dose-measuring device for radiation which permits, without integration, of a direct reading of the dose given by the position of a pointer on a scale.

In accordance with the invention, this dose-measuring device is constituted by a quadrant electrometer enclosed in a hermetically-sealed casing, the internal wall of which at least is conductive and is adapted to liberate electrons under the action of the penetrating ionising radiation, the moving blade of the quadrant electrometer being electrically coupled to the said wall, whilst the fixed quadrants are insulated inside the said casing, the latter being provided with means for transmitting an electric charge from the exterior to the said fixed quadrants.

In an instrument of this kind, the radiation-detecting member is constituted, on the one hand by the fixed condenser formed by the casing and the fixed quadrants and, on the other hand, by the variable condenser formed by the said fixed quadrants and the moving blade, these two condensers playing the part of an ionisation chamber.

By virtue of the sealing of its casing (provided that the precaution has been taken of eliminating all internal humidity) an electrometer of this kind does not discharge to any appreciable extent in the absence of radiation. In order to preserve this hermetical tightness, it is necessary, in particular, that the means provided for the transmission of the charge to the fixed quadrants through the casing do not affect it adveresly. To this end, the casing may be constituted locally by an elastic wall of conductive rubber which can be brought into contact with the fixed quadrants by a mechanical deformation, in order to permit of the charge of these quadrants through the said conductive rubber.

In order that the indication given by the instrument may be valid, it is necessary that the dose indicated should be practically independent of the energy of radiation received which, in certain cases, may exceed 10 MeV.

Now, the ionising radiation liberates electrons, either by a photo-electric effect or by the Compton effect, the quantity of electrons emitted as a result of each of these two effects being variable in dependence on the radiation energy, the electric field and the nature of the interposed material.

In order to obtain a satisfactory proportion between the ionisation produced by the emitted electrons and the received dose of radiation, according to the invention, there is utilised a relatively weak electric field and the conducting parts of the instrument are of light materials, that is to say with a low atomic weight, and they are preferably given a surface treatment with products composed of substances which have atomic weights as low as possible. To this end, use may be made for example, of anodically oxidised aluminum, or aluminum covered with a thin coat of cellulose varnish. The conducting parts may also be obtained by coating with graphite, which may be in the colloidal state.

The description which follows below with reference to the attached drawings (which are given by way of example only and not in any sense by way of limitation) will make it quite clear how the invention may be carried into effect, the special features which are brought out, either in the drawings or in the text, being understood to form a part of the said invention.

Fig. 1 is a plan view taken along the line I—I of Fig. 2, and showing an instrument in accordance with the invention, the bottom of the instrument being omitted.

Fig. 2 is a cross-section following the line II—II of Fig. 1.

The instrument shown in these figures is made up of a casing formed by a base 1 and a cover 2 which are precisely fitted into each other and which are assembled together by means of screws 3. In order to ensure complete tightness, the cover and the base may, in addition, be glued together.

The cover 2 is provided with an opening in the form of a segment which is closed in an air-tight manner by a glass window 4 held in position by clips 5 and screws 6 which fix in position the elastic stop members provided to limit the travel of the pointer 8a. The latter is an extension of the sector-shaped blade 8 which is pivotally mounted between the bearing sockets 9 and is balanced by the small conductive plate 10. This small plate 10 pivots between the arms of the horse-shoe magnet 11 and ensures the damping of the moving system. The magnet 11 carries the bearing sockets in added separate end members one of which is provided with lateral lugs 11a by means of which the whole is fixed to the cover 2 by means of screws 19. Through the screws 19, the magnet 11, the bearing sockets 9, and the pivots of the blade 8, a conductive connection is ensured between the blade and the wall of the casing. Finally, the blade 8 is subjected to the action of a spiral return spring 12 which fixes its position of rest.

The plane of the blade 8 passes through the centre of the space between the fixed quadrants 13, which are held apart by the conductive spacing member 14 and supported by the insulating block 15, the wall of which is preferably channelled at 15a in order to increase the length of the leakage paths. The insulating block 15 is applied and fixed in an air-tight manner against the cover 2 by means of the screws 21. The quadrants 13 are fixed on this block by the screws 16.

The block 15 is hollowed out to provide a housing for a diaphragm 17 of conductive rubber, the edges of which are fixed in an air-tight manner in the opening of the block 15, by means of the insulating ring 18. Thus, by depressing the diaphragm 17 by means of a conductive rod under tension, it may be caused to take up the position marked in dotted lines at 17a, that is to say, to touch the fixed quadrants and thus to charge the latter to the desired potential.

When the elecrometer is charged, the blade 8 is attracted between the quadrants, and it separates further from them as the electrometer discharges under the action of the ionising radiation.

The capacity of measurement of an instrument of this kind may be increased by increasing its electrical capacity, that is to say, by arranging in the casing, between the conducting wall and the insulating quadrants, a condenser of pre-determined value. One of the plates of this condenser is connected to the internal wall of the casing and the other to the quadrants 13.

In a particular example of construction, the external dimensions of the casing are 8 x 10 x 3 cm. The casing, together with the fixed quadrants, is of anodically oxidised aluminium. The pointer 8a moves along a path of 50 mm. in length which is visible in the window in front of the graduation carried by the sheet 20. The electrometer is charged to 450 volts. When the casing has been hermetically glued, a small quantity of silica gel is placed inside in order to ensure the desiccation of air enclosed.

In these conditions, the quantity read-off is independent of the energy of incident radiations between 200,000 and 2,000,000 volts.

Depending on the value of the condenser which is put in parallel, the total scale indicates from 0.125 to 100 Roentgen. The time constant of the instrument which can indicate 100 Roentgen is of the order of three months.

In the instrument described, the dielectric is dry air, but it is possible to use other dielectrics, liquid or gaseous, at different pressures and carefully freed from humidity.

In order to charge the instrument, an external source may be used, or a charger may alternatively be provided and incorporated in the instrument, for example of the electrostatic type.

It will, of course, be understood that modifications may be made to the dose-measuring device which has just been described above, in particular by the substitution of equivalent technical means, without thereby departing from the spirit or from the scope of the present invention.

What I claim is:

1. A portable dose-measuring device for ionizing radiations comprising an air-tight substantially flat casing of a metal of low atomic weight having in the flat walls thereof an opening and a transparent portion; a dielectric fluid inside said casing; an insulating support having a perforation fixed internally to the wall of said casing with the said perforation in register with said opening; a pair of parallel spaced-apart sector-shaped metal blades which are mechanically and electrically connected together and fast with said support in substantially parallel relationship with said flat walls one of said blades closing the internal opening of said perforation; a further sector-shaped metal blade pivotally carried inside said casing in coaxial relationship with said first blades for rotation midway between said first blades, said further blade being visible through said transparent portion; electrical connecting means between said further blade and said wall; resilient restoring means for urging said further blade out of the space between said first blades; and an obturating member of plastic conducting material held in said insulating support in said perforation thereof for tightly closing the same, said member being adapted to make contact by elastic deformation with the blade internally closing said perforation.

2. A portable measuring device according to claim 1, wherein the casing and the blades are made of anodically oxidized aluminum.

3. A portable measuring device according to claim 1, wherein said further blade diametrically extends beyond the pivot thereof and further comprising a flat conducting counter-weight held by said extension and a horse-shoe magnet internally fixed to the wall of said casing, the arms of said magnet being located on each side of the said flat counter-weight.

4. A portable measuring device in accordance with claim 3, further comprising a conducting pivot member fast with each arm of said magnet and two further conducting pivot members fast with said further blade, each cooperating with one of said first pivot members whereby the electrical connection between said wall and said further blade is obtained through said magnet and said pivot members.

5. A portable measuring device according to claim 1, wherein said further blade is extended to form a radial pointer with respect to its pivot and wherein said transparent portion is sector-shaped and extends over the path of said pointer.

References Cited in the file of this patent

UNITED STATES PATENTS

| | | |
|---|---|---|
| 2,587,254 | Victoreen | Feb. 26, 1952 |
| 2,634,374 | Shonka | Apr. 7, 1953 |
| 2,638,552 | Landsverk | May 12, 1953 |
| 2,668,245 | Rich | Feb. 2, 1954 |